United States Patent [19]

Beyerlein et al.

[11] Patent Number: 5,933,806
[45] Date of Patent: Aug. 3, 1999

[54] METHOD AND SYSTEM FOR PATTERN RECOGNITION BASED ON DYNAMICALLY CONSTRUCTING A SUBSET OF REFERENCE VECTORS

[75] Inventors: Peter Beyerlein, Aachen; Meinhard D. Ullrich, Köln, both of Germany

[73] Assignee: U.S. Philips Corporation, New York, N.Y.

[21] Appl. No.: 08/704,201

[22] Filed: Aug. 28, 1996

[30] Foreign Application Priority Data

Aug. 28, 1995 [EP] European Pat. Off. ............ 95202317

[51] Int. Cl.$^6$ ........................................ G06K 9/00
[52] U.S. Cl. .................. 704/256; 704/251; 704/252; 704/232
[58] Field of Search .................. 704/256, 259, 704/251, 252

[56] References Cited

U.S. PATENT DOCUMENTS

| | | | |
|---|---|---|---|
| 4,319,221 | 3/1982 | Sakoe | 704/256 |
| 4,384,273 | 5/1983 | Ackland et al. | 704/256 |
| 4,870,414 | 9/1989 | Karabed | 341/57 |
| 5,278,942 | 1/1994 | Bahl et al. | 704/256 |
| 5,617,486 | 4/1997 | Chow et al. | 704/256 |
| 5,710,866 | 1/1998 | Alleva et al. | 704/256 |
| 5,719,344 | 2/1998 | Pawate | 84/609 |
| 5,754,681 | 5/1998 | Watanabe et al. | 704/256 |

FOREIGN PATENT DOCUMENTS

| | | |
|---|---|---|
| 0627726A1 | 7/1994 | European Pat. Off. . |
| 0615227A2 | 9/1994 | European Pat. Off. . |

OTHER PUBLICATIONS

L. Rabiner, "A Turorial on Hidden Markov Models and Selected Applications in Speech Recognition", Proceeding of the IEEE, vol. 77, No. 2, Feb. 1989.

E. Bocchieri, "Vector quantization for the efficient computation of continuous density likelihoods", proceedings of ICASSP 1993, pp. 692–695.

*Primary Examiner*—David R. Hudspeth
*Assistant Examiner*—Daniel Abebe

[57] ABSTRACT

A system and method are used for recognising a time-sequential input pattern (20), which is derived from a continual physical quantity, such as speech. The system has input means (30), which accesses the physical quantity and therefrom generates a plurality of input observation vectors. The input observation vectors represent the input pattern. A reference pattern database (40) is used for storing a plurality of reference patterns. Each reference pattern includes a sequence of reference units, where each reference unit is represented by at least one associated reference vector $\bar{\mu}_a$ in a set $\{\bar{\mu}_a\}$ of reference vectors. A localizer (50) is used for locating among the reference patterns stored in the reference pattern database (40), a recognised reference pattern, which corresponds to the input pattern. The locating includes selecting a subset $\{\bar{\mu}_s\}$ of reference vectors from said set $\{\bar{\mu}_a\}$ for each input observation vector $\bar{o}$ by calculating a measure of dissimilarity between the input observation vector $\bar{o}$ and each reference vector of the set $\{\bar{\mu}_a\}$. A number of reference vectors $\bar{\mu}_a$, whose measures of dissimilarity with said input observation vector $\bar{o}$ are the smallest, are used as the subset $\{\bar{\mu}_s\}$ of reference vectors. The reference vectors of the subset $\{\bar{\mu}_s\}$ are used to calculate for each reference pattern, a pattern similarity score. The recognised pattern is one of the reference patterns for which an optimum of the pattern similarity scores is calculated. Output means (70) are used for outputting the recognised pattern.

19 Claims, 4 Drawing Sheets

$$\bar{x} = \begin{pmatrix} 51 \\ -72 \\ 46 \end{pmatrix} \quad ; \quad \bar{S}(\bar{x}) = \begin{pmatrix} 1 \\ -1 \\ 1 \end{pmatrix}$$

FIG. 5

| i | $\bar{y}_i$ | $\bar{x}-\bar{y}_i$ | $\|\bar{x}-\bar{y}_i\|_1$ | $\bar{S}(\bar{y}_i)$ | $\bar{S}(\bar{x})-\bar{S}(\bar{y}_i)$ | $\|\bar{S}(\bar{x})-\bar{S}(\bar{y}_i)\|_1$ |
|---|---|---|---|---|---|---|
| 0 | $\begin{pmatrix} 23 \\ -31 \\ -90 \end{pmatrix}$ | $\begin{pmatrix} 28 \\ -41 \\ 136 \end{pmatrix}$ | 205 | $\begin{pmatrix} 1 \\ -1 \\ -1 \end{pmatrix}$ | $\begin{pmatrix} 0 \\ 0 \\ 2 \end{pmatrix}$ | 2 |
| 1 | $\begin{pmatrix} 66 \\ 21 \\ 28 \end{pmatrix}$ | $\begin{pmatrix} -15 \\ -93 \\ 18 \end{pmatrix}$ | 126 | $\begin{pmatrix} 1 \\ 1 \\ 1 \end{pmatrix}$ | $\begin{pmatrix} 0 \\ -2 \\ 0 \end{pmatrix}$ | 2 |
| 2 | $\begin{pmatrix} 35 \\ 82 \\ -41 \end{pmatrix}$ | $\begin{pmatrix} 16 \\ -154 \\ 87 \end{pmatrix}$ | 257 | $\begin{pmatrix} 1 \\ 1 \\ -1 \end{pmatrix}$ | $\begin{pmatrix} 0 \\ -2 \\ 2 \end{pmatrix}$ | 4 |
| 3 | $\begin{pmatrix} -96 \\ 40 \\ 70 \end{pmatrix}$ | $\begin{pmatrix} 147 \\ -112 \\ -24 \end{pmatrix}$ | 283 | $\begin{pmatrix} -1 \\ 1 \\ 1 \end{pmatrix}$ | $\begin{pmatrix} 2 \\ -2 \\ 0 \end{pmatrix}$ | 4 |
| 4 | $\begin{pmatrix} 40 \\ 33 \\ -34 \end{pmatrix}$ | $\begin{pmatrix} 11 \\ -105 \\ 80 \end{pmatrix}$ | 195 | $\begin{pmatrix} 1 \\ 1 \\ -1 \end{pmatrix}$ | $\begin{pmatrix} 0 \\ -2 \\ 2 \end{pmatrix}$ | 4 |
| 5 | $\begin{pmatrix} -35 \\ 87 \\ 65 \end{pmatrix}$ | $\begin{pmatrix} 86 \\ -159 \\ -19 \end{pmatrix}$ | 264 | $\begin{pmatrix} -1 \\ 1 \\ 1 \end{pmatrix}$ | $\begin{pmatrix} 2 \\ -2 \\ 0 \end{pmatrix}$ | 4 |
| 6 | $\begin{pmatrix} 19 \\ 60 \\ -13 \end{pmatrix}$ | $\begin{pmatrix} 32 \\ -132 \\ 59 \end{pmatrix}$ | 223 | $\begin{pmatrix} 1 \\ 1 \\ -1 \end{pmatrix}$ | $\begin{pmatrix} 0 \\ -2 \\ 2 \end{pmatrix}$ | 4 |
| 7 | $\begin{pmatrix} 61 \\ -5 \\ 8 \end{pmatrix}$ | $\begin{pmatrix} -10 \\ -67 \\ 38 \end{pmatrix}$ | 115 | $\begin{pmatrix} 1 \\ -1 \\ 1 \end{pmatrix}$ | $\begin{pmatrix} 0 \\ 0 \\ 0 \end{pmatrix}$ | 0 |
| 8 | $\begin{pmatrix} 74 \\ -53 \\ 5 \end{pmatrix}$ | $\begin{pmatrix} -23 \\ -19 \\ 41 \end{pmatrix}$ | 83 | $\begin{pmatrix} 1 \\ -1 \\ 1 \end{pmatrix}$ | $\begin{pmatrix} 0 \\ 0 \\ 0 \end{pmatrix}$ | 0 |
| 9 | $\begin{pmatrix} -59 \\ -39 \\ 1 \end{pmatrix}$ | $\begin{pmatrix} 110 \\ -33 \\ 45 \end{pmatrix}$ | 188 | $\begin{pmatrix} -1 \\ -1 \\ 1 \end{pmatrix}$ | $\begin{pmatrix} 2 \\ 0 \\ 0 \end{pmatrix}$ | 2 |

$$\bar{x} = \begin{pmatrix} 51 \\ -72 \\ 46 \end{pmatrix} \; ; \; \bar{S}(x) = \begin{pmatrix} 1 \\ -1 \\ 1 \end{pmatrix} \; ; \; \|\bar{x}\|_1 = 169 \; ; \; \bar{S}(x) \cdot \frac{\|\bar{x}\|_1}{3} = \begin{pmatrix} 56\tfrac{1}{3} \\ -56\tfrac{1}{3} \\ 56\tfrac{1}{3} \end{pmatrix}$$

| i | $\bar{y}_i$ | $\bar{S}(\bar{y}_i)$ | $\|\bar{y}_i\|_1$ | $\bar{S}(\bar{y}_i) \cdot \frac{\|\bar{y}_i\|_1}{4}$ | $\bar{S}(x) \cdot \frac{\|\bar{x}\|_1}{4} - \bar{S}(\bar{y}_i) \frac{\|\bar{y}_i\|_1}{4}$ | $d_{\overline{xy}}$ | $\|\bar{x} - \bar{y}_i\|_1$ |
|---|---|---|---|---|---|---|---|
| 0 | $\begin{pmatrix} 23 \\ -31 \\ -90 \end{pmatrix}$ | $\begin{pmatrix} 1 \\ -1 \\ -1 \end{pmatrix}$ | 144 | $\begin{pmatrix} 48 \\ -48 \\ -48 \end{pmatrix}$ | $\begin{pmatrix} 8\tfrac{1}{3} \\ -8\tfrac{1}{3} \\ 104\tfrac{1}{3} \end{pmatrix}$ | 121 | 205 |
| 1 | $\begin{pmatrix} 66 \\ 21 \\ 28 \end{pmatrix}$ | $\begin{pmatrix} 1 \\ 1 \\ 1 \end{pmatrix}$ | 115 | $\begin{pmatrix} 38\tfrac{1}{3} \\ 38\tfrac{1}{3} \\ 38\tfrac{1}{3} \end{pmatrix}$ | $\begin{pmatrix} 18 \\ -96\tfrac{2}{3} \\ 18 \end{pmatrix}$ | $132\tfrac{2}{3}$ | 126 |
| 2 | $\begin{pmatrix} 35 \\ 82 \\ -41 \end{pmatrix}$ | $\begin{pmatrix} 1 \\ 1 \\ -1 \end{pmatrix}$ | 158 | $\begin{pmatrix} 52\tfrac{2}{3} \\ 52\tfrac{2}{3} \\ -52\tfrac{2}{3} \end{pmatrix}$ | $\begin{pmatrix} 3\tfrac{2}{3} \\ -109 \\ 109 \end{pmatrix}$ | $221\tfrac{2}{3}$ | 257 |
| 3 | $\begin{pmatrix} -96 \\ 40 \\ 70 \end{pmatrix}$ | $\begin{pmatrix} -1 \\ 1 \\ 1 \end{pmatrix}$ | 206 | $\begin{pmatrix} -68\tfrac{2}{3} \\ 68\tfrac{2}{3} \\ 68\tfrac{2}{3} \end{pmatrix}$ | $\begin{pmatrix} 125 \\ -125 \\ -12\tfrac{1}{3} \end{pmatrix}$ | $262\tfrac{1}{3}$ | 283 |
| 4 | $\begin{pmatrix} 40 \\ 33 \\ -34 \end{pmatrix}$ | $\begin{pmatrix} 1 \\ 1 \\ -1 \end{pmatrix}$ | 107 | $\begin{pmatrix} 35\tfrac{2}{3} \\ 35\tfrac{2}{3} \\ -35\tfrac{2}{3} \end{pmatrix}$ | $\begin{pmatrix} 20\tfrac{2}{3} \\ -92 \\ 92 \end{pmatrix}$ | $204\tfrac{2}{3}$ | 195 |
| 5 | $\begin{pmatrix} -35 \\ 87 \\ 65 \end{pmatrix}$ | $\begin{pmatrix} -1 \\ 1 \\ 1 \end{pmatrix}$ | 187 | $\begin{pmatrix} -62\tfrac{1}{3} \\ 62\tfrac{1}{3} \\ 62\tfrac{1}{3} \end{pmatrix}$ | $\begin{pmatrix} 118\tfrac{2}{3} \\ -118\tfrac{2}{3} \\ -6 \end{pmatrix}$ | $243\tfrac{1}{3}$ | 264 |
| 6 | $\begin{pmatrix} 19 \\ 60 \\ -13 \end{pmatrix}$ | $\begin{pmatrix} 1 \\ 1 \\ -1 \end{pmatrix}$ | 92 | $\begin{pmatrix} 30\tfrac{2}{3} \\ 30\tfrac{2}{3} \\ -30\tfrac{2}{3} \end{pmatrix}$ | $\begin{pmatrix} 25\tfrac{2}{3} \\ -87 \\ 87 \end{pmatrix}$ | $199\tfrac{2}{3}$ | 223 |
| 7 | $\begin{pmatrix} 61 \\ -5 \\ 8 \end{pmatrix}$ | $\begin{pmatrix} 1 \\ -1 \\ 1 \end{pmatrix}$ | 74 | $\begin{pmatrix} 24\tfrac{2}{3} \\ -24\tfrac{2}{3} \\ 24\tfrac{2}{3} \end{pmatrix}$ | $\begin{pmatrix} 31\tfrac{2}{3} \\ -31\tfrac{2}{3} \\ 31\tfrac{2}{3} \end{pmatrix}$ | 95 | 115 |
| 8 | $\begin{pmatrix} 74 \\ -53 \\ 5 \end{pmatrix}$ | $\begin{pmatrix} 1 \\ -1 \\ 1 \end{pmatrix}$ | 132 | $\begin{pmatrix} 44 \\ -44 \\ 44 \end{pmatrix}$ | $\begin{pmatrix} 12\tfrac{1}{3} \\ -12\tfrac{1}{3} \\ 12\tfrac{1}{3} \end{pmatrix}$ | 37 | 83 |
| 9 | $\begin{pmatrix} -59 \\ -39 \\ 1 \end{pmatrix}$ | $\begin{pmatrix} -1 \\ -1 \\ 1 \end{pmatrix}$ | 99 | $\begin{pmatrix} -33 \\ -33 \\ 33 \end{pmatrix}$ | $\begin{pmatrix} 89\tfrac{1}{3} \\ -23\tfrac{1}{3} \\ 23\tfrac{1}{3} \end{pmatrix}$ | 136 | 188 |

FIG. 8

METHOD AND SYSTEM FOR PATTERN RECOGNITION BASED ON DYNAMICALLY CONSTRUCTING A SUBSET OF REFERENCE VECTORS

BACKGROUND OF THE INVENTION

1. Field of the Invention

The invention relates to a method for recognising an input pattern which is derived from a continual physical quantity; said method comprising:

accessing said physical quantity and therefrom generating a plurality of input observation vectors, representing said input pattern;

locating among a plurality of reference patterns a recognised reference pattern, which corresponds to said input pattern; at least one reference pattern being a sequence of reference units; each reference unit being represented by at least one associated reference vector $\bar{\mu}_a$ in a set $\{\bar{\mu}_s\}$ of reference vectors; said locating comprising selecting for each input observation vector $\bar{o}$ a subset $\{\bar{\mu}_s\}$ of reference vectors from said set $\{\bar{\mu}_a\}$ and calculating vector similarity scores between said input observation vector $\bar{o}$ and each reference vector $\bar{\mu}_s$ of said subset $\{\bar{\mu}_s\}$.

The invention also relates to a system for recognising a time-sequential input pattern, which is derived from a continual physical quantity; said system comprising:

input means for accessing said physical quantity and therefrom generating a plurality of input observation vectors, representing said input pattern;

a reference pattern database for storing a plurality of reference patterns; at least one reference pattern being a sequence of reference units; each reference unit being represented by at least one associated reference vector $\bar{\mu}_a$ in a set $\{\bar{\mu}_a\}$ of reference vectors;

a localizer for locating among the reference patterns stored in said reference pattern database a recognised reference pattern, which corresponds to said input pattern; said locating comprising selecting for each input observation vector $\bar{o}$ a subset $\{\bar{\mu}_s\}$ of reference vectors from said set $\{\bar{\mu}_a\}$ and calculating vector similarity scores between said input observation vector $\bar{o}$ and each reference vector $\bar{\mu}_s$ of said subset $\{\bar{\mu}_s\}$; and output means for outputting said recognised pattern.

2. Description of the Related Art

Figure 1:
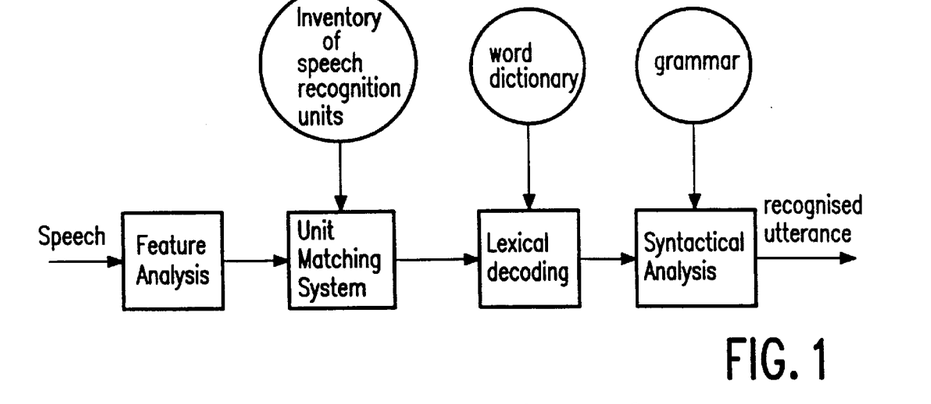
FIG. 1 illustrates the processing steps which are commonly used for continuous speech recognition.

Recognition of a time-sequential input pattern, which is derived from a continual physical quantity, such as speech or images, is increasingly getting important. Particularly, speech recognition has recently been widely applied to areas such as Telephone and telecommunications (various automated services), Office and business systems (data entry), Manufacturing (hands-free monitoring of manufacturing processes), Medical (annotating of reports), Games (voice input), voice-control of car functions and voice-control used by disabled people. For continuous speech recognition, the following signal processing steps are commonly used, as illustrated in FIG. 1 [refer L.Rabiner "A Tutorial on Hidden Markov Models and Selected Applications in Speech Recognition", Proceeding of the IEEE, Vol. 77, No. 2, February 1989]:

Feature analysis: the speech input signal is spectrally and/or temporally analyzed to calculate a representative vector of features (observation vector $\bar{o}$). Typically, the speech signal is digitised (e.g. sampled at a rate of 6.67 kHz.) and pre-processed, for instance by applying pre-emphasis. Consecutive samples are grouped (blocked) into frames, corresponding to, for instance, 32 msec. of speech signal. Successive frames partially overlap, for instance, 16 msec. Often the Linear Predictive Coding (LPC) spectral analysis method is used to calculate for each frame a representative vector of features (observation vector $\bar{o}$). The feature vector may, for instance, have 24, 32 or 63 components (the feature space dimension).

Unit matching system: the observation vectors are matched against an inventory of speech recognition units. Various forms of speech recognition units may be used. Some systems use linguistically based sub-word units, such as phones, diphones or syllables, as well as derivative units, such as fenenes and fenones. Other systems use a whole word or a group of words as a unit. The so-called hidden Markov model (HMM) is widely used to stochastically model speech signals. Using this model, each unit is typically characterised by an HMM, whose parameters are estimated from a training set of speech data. For large vocabulary speech recognition systems involving, for instance, 10,000 to 60,000 words, usually a limited set of, for instance 40, sub-word units is used, since it would require a lot of training data to adequately train an HMM for larger units. The unit matching system matches the observation vectors against all sequences of speech recognition units and provides the likelihoods of a match between the vector and a sequence. Constraints can be placed on the matching, for instance by:

Lexical decoding: if sub-word units are used, a pronunciation lexicon describes how words are constructed of sub-word units. The possible sequence of sub-word units, investigated by the unit matching system, is then constrained to sequences in the lexicon.

Syntactical analysis: further constraints are placed on the unit matching system so that the paths investigated are those corresponding to speech units which comprise words (lexical decoding) and for which the words are in a proper sequence as specified by a word grammar.

Figure 2:
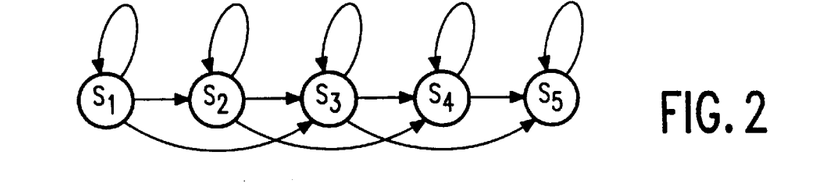
FIG. 2 shows an example of a left-right discrete Markov process.

A discrete Markov process describes a system which at any time is in one of a set of N distinct states. At regular times the system changes state according to a set of probabilities associated with the state. A special form of a discrete Markov process is shown in FIG. 2. In this so-called left-right model, the states proceed from left to right (or stay the same). This model is widely used for modelling speech, where the properties of the signal change over time. The model states can be seen as representing sounds. The number of states in a model for a sub-word unit could, for instance be, five or six. In which case a state, in average, corresponds to an observation interval. The model of FIG. 2 allows a state to stay the same, which can be associated with slow speaking. Alternatively, a state can be skipped, which can be associated with speaking fast (in FIG. 2 up to twice the average rate). The output of the discrete Markov process is the set of states at each instance of time, where each state corresponds to an observable event. For speech recognition systems, the concept of discrete Markov processes is extended to the case where an observation is a probabilistic function of the state. This results in a double stochastic process. The underlying stochastic process of state changes is hidden (the hidden Markov model, HMM) and can only be observed through a stochastic process that produces the sequence of observations.

For speech, the observations represent continuous signals. The observations can be quantised to discrete symbols chosen from a finite alphabet of, for instance, 32 to 256 vectors. In such a case a discrete probability density can be used for each state of the model. In order to avoid degradation associated with quantising, many speech recognition systems use continuous observation densities. Generally, the densities are derived from log-concave or elliptically symmetric densities, such as Gaussian (normal distribution) or Laplacian densities. During training, the training data (training observation sequences) is segmented into states using an initial model. This gives for each state a set of observations. Next, the observation vectors for each state are clustered. Depending on the complexity of the system and the amount of training data, there may, for instance, be between a 32 to 120 clusters for each state. Each cluster has its own density, such as a Gaussian density. The density is represented by a reference vector, such as a mean vector. The resulting observation density for the state is then a weighted sum of the cluster densities.

To recognise a single speech recognition unit (e.g. word or sub-word unit) from a speech signal (observation sequence), for each speech recognition unit the likelihood is calculated that it produced the observation sequence. The speech recognition unit with maximum likelihood is selected. To recognise larger sequences of observations, a levelled approach is used. Starting at the first level, likelihoods are calculated as before. Whenever the last state of a model is reached a switch is made to a higher level, repeating the same process for the remaining observations. When the last observation has been processed, the path with the maximum likelihood is selected and the path is back-traced to determine the sequence of involved speech recognition units.

The likelihood calculation involves calculating in each state the distance of the observation (feature vector) to each reference vector, which represents a cluster. Particularly in large vocabulary speech recognition systems using continuous observation density HMMs, with, for instance, 40 sub-word units, 5 states per sub-word unit and 64 clusters per state this implies 12800 distance calculations between, for instance, 32 dimensional vectors. These calculations are repeated for each observation. Consequently, the likelihood calculation may consume 50%–75% of the computing resources. It is known from E. Bocchieri "Vector quantization for the efficient computation of continuous density likelihoods", Proceeding of ICASSP, 1993, pp. 692–695 to select for each observation vector $\bar{o}$ a subset of densities (and corresponding reference vectors) and calculate the likelihood of the observation vector for the subset. The likelihood of the densities, which are not part of the selected subset, are approximated. According to the known method, during training all densities are clustered into neighbourhoods. A vector quantiser, consisting of one codeword for each neighbourhood, is also defined. For each codeword a subset of densities, which are near the codeword, is defined. This definition of subsets is done in advance, for instance during the training of the system. During recognition, for each observation vector a subset is selected from the predefined subsets by quantising the observation vector to one of the codewords and using the subset defined for the codeword as the subset of densities for which the likelihood of the observation is calculated. The disadvantage of this approach is that the subsets are statically defined based on the given reference vectors. Particularly for an observation vector which is near boundaries of the predetermined subsets, the selected subset may actually contain many reference vectors which are further from the observation vector than reference vectors in neighbouring subsets. Therefore, to achieve a low pattern error rate, the selected subset needs to be relatively large.

SUMMARY OF THE INVENTION

It is an object of the invention to provide a method and system of the kind set forth for selecting for each observation vector a subset of reference vectors, which is also based on the observation vector. It is a further object to provide a method and system which gives the potential to recognise patterns with a lower pattern error rate. It is a further object to provide a method and system which gives the potential to reduce the percentage of processing time required for the maximum likelihood calculation, without significantly increasing the pattern error rate.

To achieve this object, the method according to the invention is characterised in that selecting a subset $\{\bar{\mu}_s\}$ of reference vectors for each input observation vector $\bar{o}$ comprises calculating a measure of dissimilarity between said input observation vector $\bar{o}$ and each reference vector of said set $\{\bar{\mu}_a\}$ and using as said subset $\{\bar{\mu}_s\}$ of reference vectors a number of reference vectors $\bar{\mu}_a$, whose measures of dissimilarity with said input observation vector $\bar{o}$ are the smallest. By constructing the subset of reference vectors dynamically for each observation vector based on the dissimilarity measure, a subset is selected which with a high likelihood comprises reference vectors which are near the observation vector. This opens the way for more accurate pattern recognition. Furthermore, vectors which are not near the observation vector can, with a high likelihood, be excluded from the subset. This opens the way to faster pattern recognition.

It should be noted that it is known from EP-A-627-726 to select a subset of reference vectors by organising the reference vectors, using a tree structure, and performing a tree search. At the highest level of the tree, the root node represents all reference vectors. At one level lower in the tree, a plurality of intermediate nodes each represent a disjunct subset of reference vectors, where the subsets together form the entire set of reference vectors. This is repeated for successive lower levels, until at the lowest level each of the leaf nodes of the tree represents an actual reference vector. During the pattern recognition, for each input observation vector a tree search is performed starting at one level below the root. For each node at this level, the likelihood is calculated that the observation vector was produced by the subset represented by the node. To this end, each subset is represented by a subset vector to which the observation vector is compared. One or more nodes with maximum likelihood are selected. For these nodes, each representing a different subset of reference vectors, the same process is repeated one level lower. In this manner, finally a number of leaf nodes are selected. The reference nodes represented by the selected leaf nodes together form the finally selected subset of reference vectors. Using this method, the selected subset is based on the actual observation vector. Since the reference vectors are pre-arranged in a tree structure and are selected using the tree search, individual reference vectors are not compared to the observation vector during the selection of the subset. This adversely affects the likelihood that the nearest reference vector is a member of the selected subset.

In a first version according to the invention, the method is characterised:

in that said method comprises quantising each reference vector $\bar{\mu}_a$ to a quantised reference vector $\bar{R}(\bar{\mu}_a)$, and in that selecting the subset $\{\overline{\mu}_s\}$ of reference vectors comprises for each input observation vector $\overline{o}$ the steps of:

quantising said input observation vector $\overline{o}$ to a quantised observation vector $\overline{R(o)}$;

calculating for said quantised observation vector $\overline{R(o)}$ distances $d(\overline{R(o)}, \overline{R(\mu_a)})$ to each quantised reference vector $\overline{R(\mu_a)}$; and using said distance $d(\overline{R(o)}, \overline{R(\mu_a)})$ as said measure of dissimilarity between said input observation vector $\overline{o}$ and said reference vector $\overline{\mu}_a$. By quantising the vectors, the complexity of the vectors is reduced, making it possible to effectively calculate the distance between the quantised observation vector and the quantised reference vectors. This distance between the quantised vectors, which can be seen as an estimate of the distance between the actual vectors, is used to select the subset.

In a further version according to the invention, the method is characterised by quantising a vector $\overline{x}$ (reference vector $\overline{\mu}_a$ or observation vector $\overline{o}$) to a quantised vector $\overline{R(x)}$ by calculating a sign vector $\overline{S(x)}$ by assigning to each component of said sign vector a binary value, with a first binary value b1 being assigned if the corresponding component of the vector $\overline{x}$ has a negative value and a second binary value b2 being assigned if the corresponding component of the vector $\overline{x}$ has a positive value. Using binary values allows for a very efficient calculation and storing using a microprocessor, whereas the sign vector provides a reasonable approximation of the vector.

In a further version according to the invention, the method is characterised in that calculating said distance $d(\overline{R(o)}, \overline{R(\mu_a)})$ comprises calculating a Hamming distance $H(\overline{S(o)}, \overline{S(\mu_a)})$ of the vectors $\overline{S(o)}$ and $\overline{S(\mu_a)}$. The Hamming distance of binary vectors can be calculated very efficiently.

In a further version according to the invention, the method is characterised in that said quantising further comprises calculating an $L_r$-norm of the vector $\overline{x}$ and multiplying said norm with said sign vector $\overline{S(x)}$. This provides a good approximation of the vector. Since the $L_r$-norm of the reference vectors can be calculated in advance and the $L_r$-norm of the observation vector $\overline{o}$ only needs to be calculated once for each observation vector, the additional calculations do not seriously affect the on-line performance.

In a further version according to the invention, the method is characterised in that said quantising further comprises dividing said sign vector $S(\overline{x})$ by the dimension of the vector $\overline{x}$ to the power 1/r. This provides an even better approximation of the vector.

In a further version according to the invention, the method is characterised in that calculating said distances $d(\overline{R(o)}, \overline{R(\mu_a)})$ comprises:

calculating the $L_r$-norm $\|\overline{\mu}_a\|_r$ of each vector $\overline{\mu}_a$, and
for each input observation vector $\overline{o}$:
  calculating the $L_r$-norm $\|\overline{o}\|_r$ of the vector $\overline{o}$; and
  calculating a Hamming distance $H(\overline{S(o)}, \overline{S(\mu_a)})$ of the vector $\overline{S(o)}$ to each vector $\overline{S(\mu_a)}$.

Since the $L_r$-norm $\|\overline{\mu}_a\|_r$ of the reference vectors $\overline{\mu}_a$ can be calculated in advance and the $L_r$-norm $\|\overline{o}\|_r$ of the vector $\overline{o}$ only needs to be calculated once for each observation vector, the distance calculation has been reduced to primarily calculating the Hamming distance $H(\overline{S(o)}, \overline{S(\mu_a)})$, which can be calculated very efficiently.

In a further version according to the invention, the method is characterised in that calculating said Hamming distance $H(\overline{S(o)}, \overline{S(\mu_a)})$ of the vectors $\overline{S(o)}$ and $\overline{S(\mu_a)}$ comprises:

calculating a difference vector by assigning to each component of said difference vector the binary XOR value of the corresponding components of $\overline{S(o)}$ and $\overline{S(\mu_a)}$;

determining a difference number by calculating how many components in said difference vector have the value one, and using said difference number as the Hamming distance. The binary XOR value can be calculated very efficiently for many components in one operation.

In a further version according to the invention, the method is characterised:

in that said method comprises constructing a table specifying for each N-dimensional vector, with components having a binary value of zero or one, a corresponding number, indicating how many components have the value one; and in that determining said difference number comprises locating said difference vector in said table and using said corresponding number as the Hamming distance. By counting in advance the number of one elements in a vector and storing this in a table, the performance is increased further.

In a further version according to the invention, the method is characterised in that said method is adapted to, after having selected a subset of reference vectors for a predetermined input observation vector $\overline{o}$, use the same subset for a number of subsequent observation vectors. By using the same subset for a number of successive observation vectors, the performance is improved further.

In a further version according to the invention, the method is characterised in that said method comprises:

after selecting said subset of reference vectors for an input observation vector $\overline{o}$, ensuring that each reference unit is represented by at least one reference vector in said subset, by adding for each reference unit, which is not represented, a representative reference vector to said subset. The accuracy of the recognition is improved if each reference unit is represented in the subset.

In a further version according to the invention, the method is characterised in that said method comprises:

after ensuring that each reference unit is represented by at least one reference vector in said subset, choosing for each reference unit said representative reference vector by selecting as the representative reference vector the reference vector from the subset, which represents said reference unit and has a smallest distance to said input observation vector $\overline{o}$. Since the observation vectors tend to change gradually, a reference vector which was found to be the best representation of a reference unit for a specific observation vector is a good candidate for supplementing the subset for a subsequent observation vector.

To achieve the object of the invention, the system according to the invention is characterised in that selecting a subset $\{\overline{\mu}_s\}$ of reference vectors for each input observation vector $\overline{o}$ comprises calculating a measure of dissimilarity between said input observation vector $\overline{o}$ and each reference vector of said set $\{\overline{\mu}_a\}$ and using as said subset $\{\overline{\mu}_s\}$ of reference vectors a number of reference vectors $\overline{\mu}_a$, whose measures of dissimilarity with said input observation vector $\overline{o}$ are the smallest.

A first embodiment of a system according to the invention is characterised in that said reference pattern database further stores for each reference vector $\overline{\mu}_a$ a quantised reference vector $\overline{R(\mu_a)}$; and in that selecting the subset $\{\overline{\mu}_s\}$ of reference vectors comprises for each input observation vector $\overline{o}$ the steps of:

quantising said input observation vector $\overline{o}$ to a quantised observation vector $\overline{R(o)}$;

calculating for said quantised observation vector $\overline{R(o)}$ distances $d(\overline{R(o)}, \overline{R(\mu_a)})$ to each quantised reference vector $\overline{R(\mu_a)}$; and using said distance $d(\overline{R(o)}, \overline{R(\mu_a)})$ as said measure of dissimilarity between said input observation vector $\overline{o}$ and said reference vector $\overline{\mu}_a$.

A further embodiment of a system according to the invention is characterised in that for each reference vector $\overline{\mu}_a$ the reference pattern database comprises the $L_r$-norm $\|\overline{\mu}_a\|_r$ of the reference vector $\overline{\mu}_a$; and in that said localizer calculates said distances $d(\overline{R(o)}, \overline{R(\mu_a)})$ by, for each input observation vector $\overline{o}$:

calculating the $L_r$-norm $\|\overline{o}\|_r$ of the vector $\overline{o}$ and a Hamming distance $H(\overline{S(o)}, \overline{S(\mu_a)})$ of the vector $\overline{S(o)}$ to each vector $\overline{S(\mu_a)}$, and combining the $L_r$-norm $\|\overline{o}\|_r$ and the Hamming distance $H(\overline{S(o)}, \overline{S(\mu_a)})$ with the $L_r$-norm $\|\overline{\mu}_a\|_r$ stored in said reference pattern database.

A further embodiment of a system according to the invention is characterised in that said system comprises a memory for storing a table specifying for each N-dimensional vector, with components having a binary value of zero or one, a corresponding number, indicating how many components have the value one; and in that determining said difference number comprises locating said difference vector in said table and using said corresponding number as the Hamming distance.

These and other aspects of the invention will be apparent from and elucidated with reference to the embodiments shown in the drawings.

BRIEF DESCRIPTION OF THE DRAWING

FIG. 5 illustrates results obtained with the first vector quantisation, FIG. 8 illustrates an example of the method.

DESCRIPTION OF THE PREFERRED EMBODIMENTS

Figure 3:
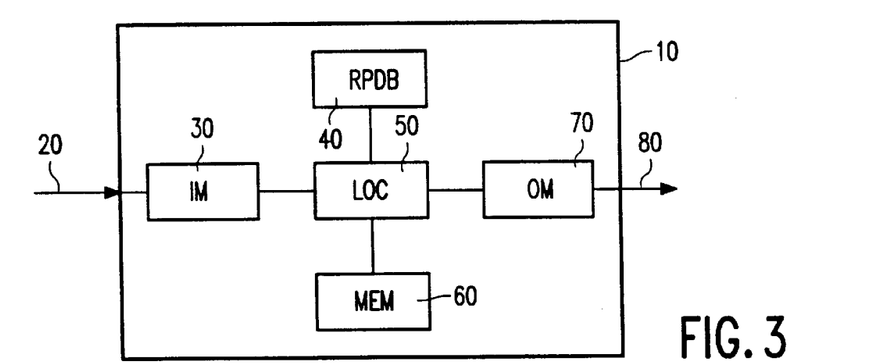
FIG. 3 shows a block-diagram of an embodiment of a system according the present invention.

FIG. 3 shows a block diagram of a system 10 according to the invention, for recognising a time-sequential input pattern 20 which is derived from a continual physical quantity, such as speech or images. Input means 30 recurrently accesses the physical quantity. For speech, this usually involves sampling the physical quantity at regular intervals, such as 6.67 kHz. or 16 kHz. and digitising the sample. The input means 30 processes a group of consecutive samples, corresponding to, for instance 32 msec. of speech signal, to provide a representative vector of features (the input observation vector $\overline{o}$). In this way a time sequence of input observation vectors is generated, which represents the input pattern. Typically, the input means 30 may be implemented using a microphone, an A/D converter and a processor, such as a Digital Signal Processor (DSP).

Optionally, the input means 30 may comprise a speech detector for effecting the sampling only when speech is effectively received. As an alternative to sampling and digitising the input signal, the signal may have been stored in memory in a digitised form or may be supplied digitally via a communication network. A reference pattern database 40 is used for storing reference patterns. As described earlier, speech recognition units are used as reference patterns for recognising speech. Each reference pattern comprises a sequence of reference units. Each reference unit is represented by at least one associated reference vector $\overline{\mu}_a$. All reference vectors together form a set $\{\overline{\mu}_a\}$ of reference vectors. Using pattern recognition based on Hidden Markov Models, each reference pattern is modelled by a Hidden Markov Model, where the states of the model correspond to a reference unit. Using continuous observation densities, such as Gaussian or Laplacian densities, the reference vectors correspond to the mean vectors of the densities. The reference database 40 may be stored in memory, such as a harddisk, ROM or RAM as an integrated database or, alternatively, as separate data files.

The system 10 further comprises a localizer 50 for locating in the reference pattern database 40 a reference pattern which corresponds to the input pattern. The localizer 50 may be implemented using a DSP or micro-processor. The located reference pattern is referred to as the recognised reference pattern. As described earlier this involves calculating a likelihood of the observation vector. For each Hidden Markov Model and each state s of the model, the likelihood of an observation vector $\overline{o}$ is given by:

$$p(\overline{o}) = \sum_{k=1}^{N} w(k) \cdot p(\overline{o}|k)$$

where w(k) is the weight of the k-th observation mixture density (cluster) and N is the number of clusters for a state. For simplicity, the state s is not shown in the formula. Speech recognition systems usually use Laplacian or Gaussian probability densities to model the probability distribution of a cluster. Using the $L_r$-norm, defined as:

$$d_r(\overline{x}, \overline{y}) = \|\overline{x} - \overline{y}\|_r = \left(\sum_{i=1}^{D} |x_i - y_i|^r\right)^{\frac{1}{r}}$$

where the $L_1$-norm is used for Laplacian densities and the $L_2$-norm is used for Gaussian densities, gives as one of the possible formulas for the probability:

$$p(\overline{o}) = \sum_{k=1}^{N} w(k) \cdot a \cdot e^{-b\|\overline{o} - \overline{\mu}(k)\|_r^r}$$

where the reference vector $\overline{\mu}(k)$ is the mean vector of the k-th observation mixture density. The coefficients a and b ensure that the probability integrates up to 1 if the observation vector $\overline{o}$ is run over all possible values. Various forms or extensions of this formula are well known. As an example, the following three Gaussian densities are given:

Full covariance matrix $K_{s,k}$: $p(\overline{o}|k) =$ $$\frac{1}{\sqrt{(2\pi)^D \det K_{s,k}}} \cdot e^{-\frac{1}{2}(\overline{o}-\overline{\mu}_{s,k})^T K_{s,k}^{-1}(\overline{o}-\overline{\mu}_{s,k})}$$

Diagonal covariance matrix $(K_{s,k})_{dd} =$ $$\sigma_d^2 : p(\overline{o}|k) = \frac{1}{\sqrt{(2\pi)^D \prod_{k=1}^{D} \sigma_k^2}} \cdot e^{-\frac{1}{2}\sum_{k=1}^{D}(\overline{o}-\mu_k)^2/\sigma_k^2}$$

Scalar variance $K_{s,k} = 1 \cdot \sigma_{s,k}^2$: $p(\overline{o}|k) = \frac{1}{\sqrt{(2\pi)^D (\sigma_k^2)^D}} \cdot e^{-\frac{1}{2\sigma_k^2}\|\overline{o}-\overline{\mu}_k\|^2}$ It will be appreciated that also other distance measures than the $L_r$-norm may be used.

Advantageously, the observation vector $\overline{o}$ and the mean vectors $\overline{\mu}(k)$ are scaled before the likelihood calculation takes place. Scaling can be used to prevent that terms fall below the precision range of the processor and to normalise the vectors according to the variance of the density. The scaling may be performed by multiplying the vectors with a diagonal D×D matrix V, where D is the dimension of the feature vector space.

$$V = \begin{pmatrix} v_1 & 0 & \cdots & & 0 \\ 0 & v_2 & \cdot & & \cdot \\ \cdot & \cdot & \cdot & & \cdot \\ \cdot & & \cdot & \cdot & \cdot \\ \cdot & & & v_{D-1} & 0 \\ 0 & \cdots & & 0 & v_D \end{pmatrix}$$

The matrix elements $V_1$ to $V_D$ are estimated during training. Starting with the complete set of reference vectors, for each component separately a common variance is calculated, resulting in one pooled variance vector. Of all reference vectors, the vector components are divided by the corresponding pooled standard deviation and re-scaled with a value $\gamma$ to bring the component in the required range. The value $\gamma$ is the same for each vector component. Other forms of scaling are well-known. Advantageously, the reference vectors are scaled in advance and the observation vector is only scaled once before starting the actual likelihood calculations.

Due to the nature of the densities, the sum of probabilities can be approximated by the maximum, i.e. the density which contributes the largest probability. This implies that a key step in locating a reference pattern which corresponds to the input pattern is finding the reference vector which is nearest the observation vector (nearest neighbour search):

$$p(\overline{o}) \approx \max\{w(k) \cdot a \cdot e^{-b\|\overline{o}-\overline{\mu}(k)\|^r} | k=1, \ldots, N\}$$

By taking the logarithm, this gives:

$$\log(p(\overline{o})) \approx -\min\{b\|\overline{o}-\overline{\mu}(k)\|^r - \log(w(k)) | k=1, \ldots, N\} - \log(a)$$

The constant $\log(a)$ can be ignored. As an alternative to separately subtracting the term $\log(w(k))$, new extended vectors $\overline{p}$ and $\overline{q}(k)$ may be introduced, defined by:

$$\overline{p}^T = (b\overline{o}^T, 0), \overline{q}(k)^T = (b\overline{\mu}^T, (-\log(w(k)))^{1/r})$$

In this formula it should be noted that $-\log(w(k)) > 0$. Using the extended vectors gives:

$$\log(p(\overline{o})) \approx -\min\{\|\overline{p}-\overline{q}(k)\|^r | k=1, \ldots, N\} - \log(a)$$

Since, $\overline{p}$ and $\overline{q}(k)$ have one more component, their dimension is D+1, where D is the imension of the feature vector space.

In the remainder of the document reference is made to the vectors $\overline{x}$ and $\overline{y}$, where $\overline{x}=\overline{o}$ and $\overline{y}=\overline{\mu}$. It will be appreciated that the same concepts, as described next, can be applied to the vectors $\overline{p}$ and $\overline{q}$ by reading $\overline{x}=\overline{p}$ and $\overline{y}=\overline{q}$.

Conventional pattern recognition involves calculating vector similarity scores, such as the maximum likelihood or, as part of that, the distance, between the input observation vector $\overline{o}$ and each reference vector. As described earlier, the maximum likelihood calculation for large vocabulary systems may involve over 10,000 distance calculations between, for instance, 32 dimensional vectors. These calculations are repeated for each observation. Instead of calculating all distances in full, the localizer 50 of FIG. 3 first selects a subset $\{\overline{\mu}_s\}$ of reference vectors from the total set $\{\overline{\mu}_a\}$ of reference vectors. The localizer 50 then only calculates the full distance for reference vectors of the subset $\{\overline{\mu}_s\}$. According to the invention the localizer 50 determines the subset $\{\overline{\mu}_s\}$ by calculating a measure of dissimilarity between the input observation vector $\overline{o}$ and each reference vector of the total set $\{\overline{\mu}_a\}$. Then, a number of reference vectors for which the smallest measure of dissimilarity was calculated are used as the subset. The number may be chosen as a fixed number or a percentage of the total number of reference vectors. Alternatively, the localizer 50 selects reference vectors $\overline{\mu}_a$ whose distances $d(\overline{R(o)}, \overline{R(\mu_a)})$ are below a predetermined threshold T. Advantageously, tests are performed to determine an optimum number or threshold, which is sufficiently low to provide a considerable performance gain but does not too severely affect the accuracy of recognition. The measure of dissimilarity is used for obtaining a ranking of the reference vectors with regard to their dissimilarity ('distance') compared to the observation vector. The ranking does not need to be fully accurate, as long as with a high likelihood the subset contains the reference vector which is near the observation vector, using the actual distance measure (likelihood calculation) which is used for the pattern recognition. This makes it possible to put less constraints on the measure of dissimilarity then are put on the actual full distance measure. Advantageously, a measure of dissimilarity is chosen which allows for a more efficient calculation of an approximate distance than the full distance calculation.

In a further embodiment according to the invention the localizer 50 determines the subset $\{\overline{\mu}_s\}$ by:

Quantising each reference vector $\overline{\mu}_a$ to a quantised vector $\overline{R(\mu_a)}$. This can already be done during training, when the reference vectors are determined. In this case, the quantised vector $\overline{R(\mu_a)}$ can, advantageously, be stored in the reference pattern database 40 before the actual speech recognition starts. This improves the on-line performance of the system.

For each input observation vector $\overline{o}$:
  quantising the input observation vector $\overline{o}$ to a quantised vector $\overline{R(o)}$,
  calculating distances $d(\overline{R(o)}, \overline{R(\mu_a)})$ of the quantised vector $\overline{R(o)}$ to each quantised vector $\overline{R(\mu_a)}$, and
  using as the subset $\{\overline{\mu}_s\}$ a number of reference vectors $\overline{\mu}_a$ from the total set $\{\overline{\mu}_a\}$, whose distances $d(\overline{R(o)}, \overline{R(\mu_a)})$ are the smallest. As such, the distance $d(\overline{R(o)}, \overline{R(\mu_a)})$ is used as the measure of dissimilarity between the observation vector $\overline{o}$ and the reference vector $\overline{\mu}_a$.

The quantisation of a vector reduces the complexity of a vector. In the following embodiments various forms of quantisation are described, resulting in a simplified distance calculation between the quantised vectors. One approach is to reduce the complexity of the vector components, for instance by using as a quantised vector a vector which is proportional to a vector with binary components. Another approach is to use a quantised vector with less vector components (lower dimension) of similar complexity as the components of the original vector. Both approaches may also be combined, by using as a quantised vector a vector with some components of reduced complexity and the remaining components of similar complexity as the original vector.

In a further embodiment, as the quantised vector of a vector $\bar{z}$ a sign vector $\overline{S}(\bar{z})$ is used. The same quantisation is used for both $\bar{x}$ and $\bar{y}$. The components of $\overline{S}(\bar{z})$ have binary values representing the sign of the corresponding component of $\bar{z}$.

$$\bar{z} \rightarrow \overline{S}(\bar{z}),$$

where $$\overline{S}(\bar{z}) = \left(\text{sign}(z_1), \ldots, \text{sign}(z_D)\right)^T,$$

and $$\text{sign}(z_i) = b1, \text{ if } z_i < 0,$$
$$b2, \text{ if } z_i > 0,$$
$$\text{where } i = 1, \ldots, D$$

For components of $\overline{S}(\bar{z})$ where the corresponding component of $\bar{z}$ has the value zero, either b1 or b2 may be selected. Preferably, the same choice is made for all quantised vectors. Alternatively, a third discrete value is used to represent zero value components. The definition has been given for a system in which the original vector components are represented using signed values, such as a signed 2-byte integers. It will be understood how the same concept can be applied to unsigned values, by assigning the lower half values (0 . . . 32767) to b1 and the upper half values (32768 . . . 65535) to b2.

A good illustration of the method is achieved by using −1 for b1 and +1 for b2:

$$\bar{z} \rightarrow \overline{S}(\bar{z}),$$

where $$\overline{S}(\bar{z}) = \left(\text{sign}(z_1), \ldots, \text{sign}(z_D)\right)^T,$$

and $$\text{sign}(z_i) = -1, \text{ if } z_i < 0,$$
$$1, \text{ if } z_i > 0,$$
$$\text{where } i = 1, \ldots, D$$

Figure 4:
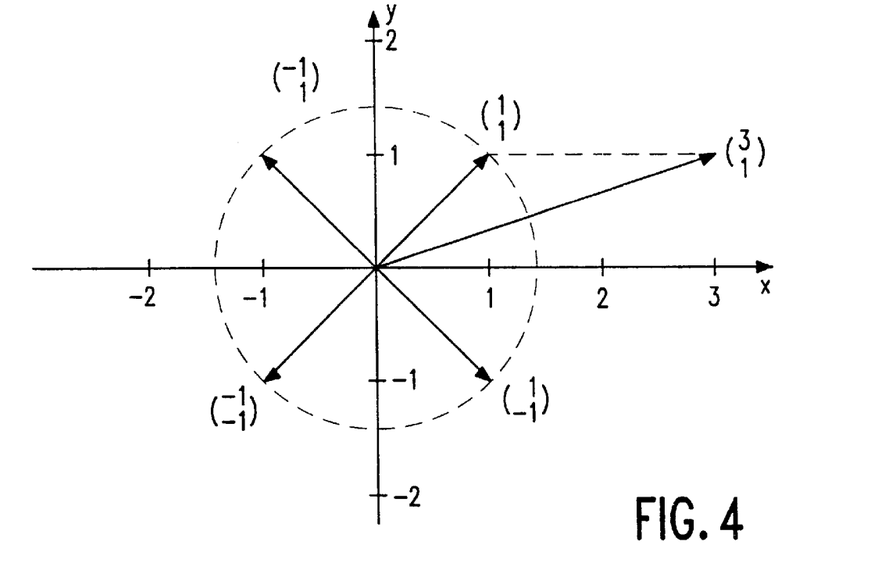
FIG. 4 shows a 2-dimensional representation of a first vector quantisation.

In this case the zero components are also represented by +1. Geometrically, this can be seen as projecting each vector onto a 'unity' vector in the middle of the same space sector as the vector itself. FIG. 4 illustrates a 2-dimensional example in which the vector $(3,1)^T$ is projected onto the vector $(1,1)^T$. The same applies for all vectors in the space sector (quadrant) I. Similarly, vectors in the space sector II are projected onto $(-1,1)^T$; vectors in the space sector III are projected onto $(-1,-1)^T$; vectors in the space sector IV are projected onto $(1,-1)^T$. As an example, in a 3-dimensional feature vector space the vector $\bar{x}=(51, -72, 46)^T$ is quantised as follows:

$$\bar{x}=(51, -72, 46)^T \rightarrow (1, -1, 1)^T = \overline{S}(\bar{x})$$

The distance $d_r(\bar{x}, \bar{y})$ between the vectors $\bar{x}$ and $\bar{y}$ is replaced by the distance $d_r(\overline{S}(\bar{x}), \overline{S}(\bar{y}))$ between the respective sign vectors:

$$d_r(\bar{x}, \bar{y}) \rightarrow d_r(\overline{S}(\bar{x}), \overline{S}(\bar{y}))$$

FIG. 5 illustrates this method for above given vector $\bar{x}$ and 10 extended 3-dimensional vectors $\bar{y}_1 \ldots \bar{y}_{10}$, representing 10 mean vectors (prototypes). In the example, the vector elements are randomly chosen integers in the range −99 to +99. It should be noted that in speech recognition systems, the vector components will typically be continuous values (mathematically seen: elements from $\mathbb{R}$), usually represented as 2- or 4-byte integers or floating numbers on a computer. The successive columns of the figure show the index $i=0, \ldots, 9$ of the ten vectors $\bar{y}_i$, the vector $\bar{y}_i$, the difference between $\bar{x}$ and $\bar{y}_i$, the distance $d_1(\bar{x}, \bar{y}_i)$ between the vectors, the sign vector of $\bar{y}_i$, the difference between the sign vectors $\overline{S}(\bar{x})$ and $\overline{S}(\bar{y}_i)$, and the distance $d_1(\overline{S}(\bar{x}), \overline{S}(\bar{y}_i))$ between the sign vectors. Using the full distance calculation ($L_1$-norm), the order in increasing distance is: $\bar{y}_8, \bar{y}_7, \bar{y}_1, \bar{y}_0, \bar{y}_9, \bar{y}_4, \bar{y}_6, \bar{y}_5, \bar{y}_3$ and $\bar{y}_2$. Using the approximated distance, the following four groups were established (in increasing distance): $\bar{y}_7$ and $\bar{y}_8$, followed by $\bar{y}_0, \bar{y}_1$, and $\bar{y}_9$, followed by $\bar{y}_2, \bar{y}_3, \bar{y}_4, \bar{y}_5$, and $\bar{y}_6$. Already with only three dimensions the vectors are sorted relatively well. It will be appreciated that in practice good results are achieved if on average half of the sign vector components have the value 1 (i.e. the sign vectors are well distributed over the space and are not clustered too much in one space sector). Advantageously, this is achieved by performing the approximation separately for each reference unit (mixture). For each reference unit a mixture mean vector is calculated and subtracted from all reference vectors which represent the reference unit. Next the reference sign vectors are calculated. Before calculating the sign vector of the observation vector, the mixture mean vector of the reference unit is subtracted from the observation vector. Next, the observation sign vector is calculated and the observation sign vector is compared to all reference sign vector for the reference unit. This operation is performed for each reference unit separately. This operation can be seen as moving the coordinate system for each reference unit (all reference vectors representing it and the observation vector). This method has been tested in the Philips research system for large vocabulary continuous speech recognition. Using 32 reference vectors for each reference unit, experiments showed that it was sufficient to select a subset of approximately 20% of the reference vectors to achieve an accurate distance calculation. This reduced the required run-time for the distance calculation by 50%.

In a further embodiment, the distance $d(\overline{S}(\bar{x}), \overline{S}(\bar{y}))$ of the vectors $\overline{S}(\bar{x})$ and $\overline{S}(\bar{y})$ is calculated by calculating a Hamming distance $H(\overline{S}(\bar{x}), \overline{S}(\bar{y}))$ of the vectors $\overline{S}(\bar{x})$ and $\overline{S}(\bar{y})$. The Hamming distance can be calculated very fast. Preferably, the sign vectors are represented by vectors with only 0 and 1 elements. For instance, the 8-dimensional sign vector $(1, -1, -1, -1, 1, 1, -1, 1)^T$ can be represented by: $(1, 0, 0, 0, 1, 1, 0, 1)^T$. Advantageously, these vectors can be stored as a sequence of bits in a computer memory. Preferably, the vectors are aligned according to the preferred alignment of the computer, such as a byte, a 16-bit or a 32-bit word. As a next step in calculating the Hamming distance, the XOR function over the entire two vectors is calculated, providing a difference vector. Each component of the difference vector contains the binary XOR value of the corresponding components of $\overline{S}(\bar{x})$ and $\overline{S}(\bar{y})$. Most micro-processors allow an XOR function to be calculated over an entire computer word in one operation. For instance, if $\overline{x}$ is represented by $(1, 0, 0, 0, 1, 1, 0, 1)^T$ and $\overline{y}$ is represented by $(1, 0, 1, 0, 0, 1, 1)^T$, this gives the difference vector $(0, 0, 1, 0, 1, 1, 1, 0)^T$. In principle, the Hamming distance can now be calculated by counting the number of 1-elements in the difference vector. In this example, the Hamming distance is four. If preferred, the Hamming distance may be multiplied by two to give the same distance as used in FIG. 5.

In a further embodiment, the Hamming distance for each difference vector is calculated in advance and stored in the form of a table in memory 60 of FIG. 3. As an example, for the bit sequence (0, 0, 1, 0, 1, 1, 1, 0)=2E (hex) the Hamming distance four can be stored at the 46-th (=2E (hex)) entry in the table. If the dimension of the vector space gets too large (e.g. more than 16), as an alternative to storing the full table, advantageously the vector can be broken into smaller units of, for instance, 16-bit. For each unit the table is used to determine the Hamming distance of the unit. The complete Hamming distance is obtained by summing the Hamming distances of each separate unit.

It will be appreciated that a further improvement in performance is achieved by reducing the dimension of the sign vector, i.e. by dropping some of the components. As an example, only half of the components are used (e.g. the first D/2 components) and the resulting estimated distance is multiplied by two to compensate for this. Advantageously, the number of components is reduced to a preferred size for processing. For instance, for many micro-processors it will be advantageous to reduce a 35-dimensional vector to a 32-dimensional vector with 1-bit components, forming a 32-bit computer-word.

Figure 6:
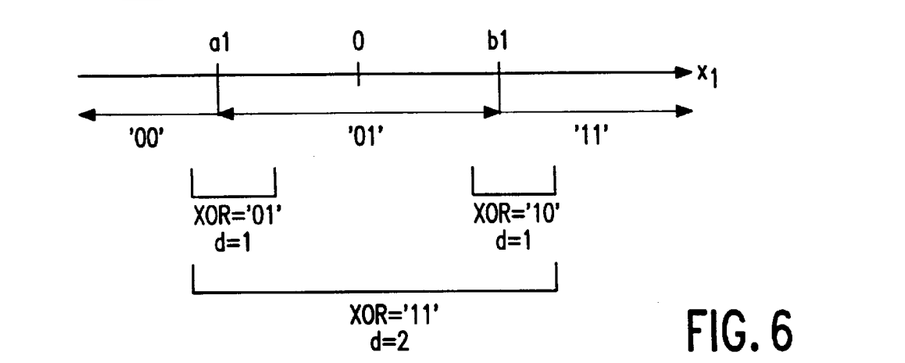
FIG. 6 shows a 2-dimensional representation of a second vector quantisation.

It will be understood that, instead of quantising a vector component by assigning it to one out of two regions (binary representation), also more than two regions may be used. As an example, three regions may be used, as illustrated in FIG. 6 for one component of the vector (the ×1 component). The components of the quantised vector $\overline{R}(\overline{z})$ have 2-bit values representing the corresponding component of $\overline{z}$.

$$\overline{z} \rightarrow \overline{R}(\overline{z}),$$

where $$\overline{R}(\overline{z}) = (f(z_1), \ldots, f(z_D))^T,$$

and $$f(z_i) = \text{'00'}, \text{ if } z_i < a_i,$$
$$\text{'01'}, \text{ if } a_i \leq z_i \leq b_i$$
$$\text{'11'}, \text{ if } z_i > b_i,$$
$$\text{where } i = 1, \ldots, D$$

As illustrated in FIG. 6, similarly as before, the binary XOR operation and the hamming distance calculation can be used to calculate a distance between the quantised vectors and to give an indication of the distance of the actual vectors, allowing a subset to be determined.

Figure 7:
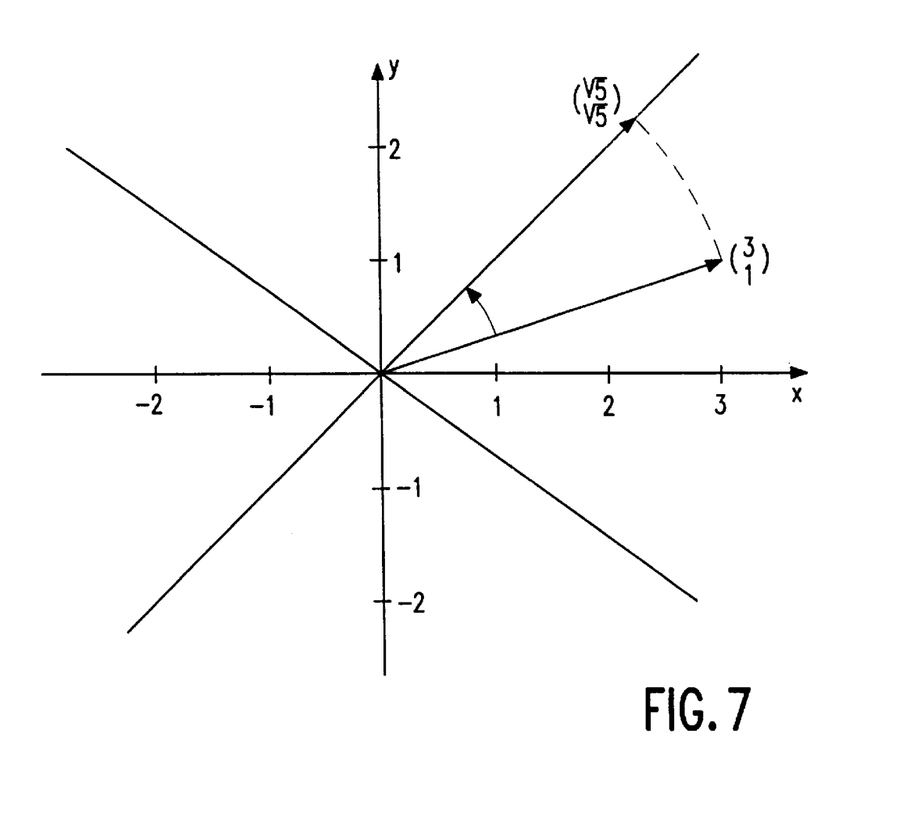
FIG. 7 illustrates results obtained with the second vector quantisation.

In an alternative embodiment, in addition to the sign vector also the norm of the vector is taken into account, providing a more accurate approximation. The approximation is based on the insight that by writing a vector $\overline{z}$ as:

$$\overline{z} = \overline{S}(\overline{z}) \frac{\|\overline{z}\|_r}{D^{\frac{1}{r}}} + \Delta \overline{z}$$

the first term is a good approximation for $\overline{z}$. Geometrically, this can be seen as projecting each vector onto the diagonal in the same space sector as the vector itself by rotating the vector. FIG. 7 illustrates a 2-dimensional example, using the $L_2$-norm, in which the vector $(3,1)^T$ is projected onto the vector $(\sqrt{5},\sqrt{5})^T$.

For the 3-dimensional example vector $\overline{x}^T=(51, -72, 46)^T$ and using the $L_1$-norm, this gives:

$$\overline{x}^T=(51, -72, 46)^T=(1, -1, 1)^T.56\tfrac{1}{3}+\Delta\overline{x}=(56\tfrac{1}{3}, -56\tfrac{1}{3}, 56\tfrac{1}{3})^T+\Delta\overline{x},$$

where $\Delta\overline{x}=(-5\tfrac{1}{3}, -15\tfrac{2}{3}, -10\tfrac{1}{3})^T$.
For the distance between $\overline{x}$ and $\overline{y}$, this gives:

$$\|\overline{x}-\overline{y}\|_r = d_{\overline{xy}} + \epsilon,$$

where $$d_{\overline{xy}} = \left\| \overline{S}(\overline{x}) \left\| \overline{x} \frac{\|_r}{D^{\frac{1}{r}}} - \overline{S}(\overline{y}) \right\| \overline{y} \frac{\|_r}{D^{\frac{1}{r}}} \right\|_r$$

The triangle inequality gives:

$$\epsilon \leq \|\Delta\overline{x}\| + \|\Delta\overline{y}\|$$

Ignoring the error $\epsilon$, the distance $d(\overline{x}, \overline{y})$ between $\overline{x}$ and $\overline{y}$ is approximated by $d_{\overline{xy}}$. FIG. 8 illustrates this method for above given vector $\overline{x}$ and 10 extended 3-dimensional vectors $\overline{y}_1 \ldots \overline{y}_{10}$, representing 10 mean vectors (prototypes). The last two columns of the figure show the approximated distance $d_{\overline{xy}}$ and the full distance between the vectors $\overline{x}$ and $\overline{y}_i$, using the $L_1$-norm. Using the full distance calculation, the order in increasing distance is: $\overline{y}_8, \overline{y}_7, \overline{y}_1, \overline{y}_0, \overline{y}_9, \overline{y}_4, \overline{y}_6, \overline{y}_5, \overline{y}_3$ and $\overline{y}_2$. Using the approximated distance, the order in increasing distance is: $\overline{y}_8, \overline{y}_7, \overline{y}_0, \overline{y}_1, \overline{y}_9, \overline{y}_6, \overline{y}_4, \overline{y}_2, \overline{y}_5,$ and $\overline{y}_3$. Already with only three dimensions of the vectors a good sorting of the vectors has been achieved.

This method has been tested in the Philips research system for large vocabulary continuous speech recognition. Using 32 observation density components (clusters), the following results have been achieved:

|  | Number of calculated distances | run time [%] | word error [%] |
|---|---|---|---|
| Full | 32 | 1.00 | 24.52 |
| HVQ-1 | 23.9 | 0.75 | 24.52 |
| HVQ-2 | 21.3 | 0.69 | 24.52 |
| HVQ-3 | 18.6 | 0.62 | 24.52 |
| HVQ-4 | 15.9 | 0.53 | 25.07 |
| HVQ-5 | 13.3 | 0.48 | 25.07 |
| HVQ-6 | 10.6 | 0.42 | 25.07 |
| HVQ-7 | 7.9 | 0.34 | 25.07 |
| HVQ-8 | 5.3 | 0.29 | 25.34 |

In the table, the first row of results shows the results of the conventional method of calculating all distances in full. The following eight rows show the results using the described method (referred to as HVQ), each time calculating a different number/percentage of distances in full. As shown in the table, by only calculating approx. 20% of the distances in full a word error rate is achieved which is still close to calculating all distances fully, but requiring approx. 30% of the computing time for the nearest neighbour search. Since the nearest neighbour search may require 50–75% of the total processing time, this reduces the total processing time by approx. 35–50%.

To achieve these results, further optimisations to calculate $d_{\overline{xy}}$ have been used as described for the further embodiments. It will be appreciated that for an approximation of the vector $\overline{z}$ also can be used:

$$\overline{z} \rightarrow \overline{S}(\overline{z}).\|\overline{z}\|_r$$

Although this approximation is less accurate than the previous approximation, the difference is a multiplication by a constant $1/D^{1/r}$, which does not affect the ranking of the vectors.

Using the definition of the $L_r$-norm, the approximated distance $d_{\overline{xy}}$ can be written as:

$$d_{\overline{xy}} = \left( \sum_{i=1}^{D} \frac{1}{D} |\overline{S_i}(\overline{x})\|\overline{x}\|_r - \overline{S_i}(\overline{y})\|\overline{y}\|_r |^r \right)^{\frac{1}{r}}$$

Considering that:

$$|\overline{S_i}(\overline{x})\|\overline{x}\|_r - \overline{S_i}(\overline{y})\|\overline{y}\|_r | = |\overline{S_i}(\overline{x})| \cdot |\|\overline{x}\|_r - \|\overline{y}\|_r|, \text{ if } \overline{S_i}(\overline{x}) = \overline{S_i}(\overline{y})$$

$$= |\overline{S_i}(\overline{x})| \cdot |\|\overline{x}\|_r + \|\overline{y}\|_r|, \text{ if } \overline{S_i}(\overline{x}) = -\overline{S_i}(\overline{y})$$

where $|\overline{S_i}(\overline{x})| = 1$ this gives:

$$(d_{\overline{xy}})^r = \sum_{i:\overline{S_i}(\overline{x})=\overline{S_i}(\overline{y})} \frac{1}{D} |\|\overline{x}\|_r - \|\overline{y}\|_r|^r + \sum_{i:\overline{S_i}(\overline{x})=\overline{S_i}(\overline{y})} \frac{1}{D} |\|\overline{x}\|_r - \|\overline{y}\|_r|^r$$

Defining:

$$q_{\overline{xy}} = \sum_{i:\overline{S_i}(\overline{x})=\overline{S_i}(\overline{y})} \frac{1}{D}, \text{ for } i = 1, \ldots, D$$

Since the dimension of the vectors is D, and according to the given definition $D.q_{\overline{xy}}$ elements have the same sign, this implies that $D-D.q_{\overline{xy}}=D.(1-q_{\overline{xy}})$ elements have a different sign. This gives:

General: $(d_{\overline{xy}})^r = q_{\overline{xy}} \|\overline{x}\|_r - \|\overline{y}\|_r|^r + (1-q_{\overline{xy}})\|\overline{x}\|_r + \|\overline{y}\|_r|^r$ For Laplacian densities ($L_1$-norm) this gives the following approximation for the distance:

Laplacian: $\|\overline{x}-\overline{y}\|_1 \approx \|\overline{x}\|_1 + \|\overline{y}\|_1 - 2q_{\overline{xy}} \min(\|\overline{x}\|_1, \|\overline{y}\|_1)$ For Gaussian densities ($L_2$-norm) this gives the following approximation for the distance:

Gaussian: $\|\overline{x}-\overline{y}\|_2^2 \approx \|\overline{x}\|_2^2 + \|\overline{y}\|_2^2 - 2(2q_{\overline{xy}}-1)\|\overline{x}\|_2 \|\overline{y}\|_2$ Consequently, by only using $q_{\overline{xy}}$ and the norms of the vectors $\overline{x}$ and $\overline{y}$ the distance can be estimated. It will be appreciated that the norm of the vectors $\overline{y}$ can be calculated in advance and, advantageously, stored in the reference pattern database 40 of FIG. 3. Furthermore, the norm of the vector $\overline{x}$ can be calculated once and used for calculating the distance to each vector $\overline{y}$. For calculating $q_{\overline{xy}}$, it should be noted that $D-D.q_{\overline{xy}}$ is the Hamming distance of the sign vectors of $\overline{x}$ and $\overline{y}$. By defining $h_{xy}$ as the Hamming distance of the sign vectors of $\overline{x}$ and $\overline{y}$, the previous three formulas can be written as:

General: $(d_{\overline{xy}})^r = \left(1 - \frac{h_{\overline{xy}}}{D}\right) |\|\overline{x}\|_r - \|\overline{y}\|_r|^r + \frac{h_{\overline{xy}}}{D} |\|\overline{x}\|_r + \|\overline{y}\|_r|^r$ and Laplacian: $\|\overline{x}-\overline{y}\|_1 \approx \|\overline{x}\|_1 + \|\overline{y}\|_1 - 2\left(1 - \frac{h_{\overline{xy}}}{D}\right) \min(\|\overline{x}\|_1, \|\overline{y}\|_1)$ and Gaussian: $\|\overline{x}-\overline{y}\|_2^2 \approx \|\overline{x}\|_2^2 + \|\overline{y}\|_2^2 - 2\left(1 - 2\frac{h_{\overline{xy}}}{D}\right)(\|\overline{x}\|_2 \|\overline{y}\|_2)$ Consequently, by using the Hamming distance $h_{\overline{xy}}$ and the norms of the vectors $\overline{x}$ and $\overline{y}$ the distance can be estimated. It will be appreciated that the accuracy can be improved by performing the operation on part vectors. The vectors $\overline{x}$ and $\overline{y}$ are broken into N part vectors and part norms are calculated. For the vector $\overline{x}$ this is defined as:

$$\overline{x} = (\overline{x_1}^T, \overline{x_2}^T, \ldots, \overline{x_N}^T)^T$$

$$\|\overline{x}\|_r^r = \sum_{i=1}^{N} \|\overline{x_i}\|_r^r$$

This gives for Laplacian densities:

Laplacian: $\|\overline{x}-\overline{y}\|_1 \approx \|\overline{x}\|_1 +$ $$\|\overline{y}\|_1 - \sum_{i=1}^{N} \left(2\left(1 - \frac{h(\overline{x_i}, \overline{y_i})}{D}\right) \min(\|\overline{x_i}\|_1, \|\overline{y_i}\|_1)\right)$$

In this formula $h(\overline{x_i}, \overline{y_i})$ is the hamming distance of the part vectors $\overline{x_i}$ and $\overline{y_i}$. If the Hamming distance is calculated by using a table for vector units, as described earlier, advantageously the same size vector units are used for the table as are used for the part vectors.

In a further embodiment, after a subset of reference vectors has been selected for an observation vector, the same subset is used for a number N of successive observation vectors, with $N \geq 1$. So, the same subset is used for N+1 observations. For the observation, which follows the N+1 observations, a new subset of reference vectors is selected. This mechanism is repeated for the following observations. The number N may be selected by performing experiments. In the Philips research system for large vocabulary continuous speech recognition good results have been achieved by using N=1 (two successive observation vectors using the same subset). As an alternative to using a predetermined number N, advantageously the localizer 50 of FIG. 3 dynamically decides whether to keep the subset, which was the determined for an earlier observation vector, or to determine a new subset for the current observation vector. Preferably, the localizer 50 makes the decision based on the dynamic behaviour of the observation vector $\overline{o}$. For instance, the localizer 50 can remember the observation vector $\overline{o}$ for which the subset was calculated. As long as subsequent observation vectors are near the memorised observation vector (i.e. the distance is below a predetermined threshold), the same subset is kept. A new subset is determined, if a subsequent observation vector is further away from the memorised observation vector.

In a further embodiment, the localizer ensures that for each reference unit at least one reference vector, which represents the reference unit, is a member of the subset of reference vectors. To this end, the localizer 50, after having selected an initial subset for an observation vector, verifies whether each reference unit is represented in the initial subset. If not, the localizer 50 adds for the reference units, which were not represented, a reference vector, which is representative for the reference unit. For each reference unit, a representative reference vector may be chosen during training. As an example, the reference vector could be chosen which is nearest the weighted average of all reference vectors representing a reference unit. If a representative reference vector is chosen in advance, this vector may advantageously be stored in the reference pattern database 40.

In a further embodiment, the representative reference vector is chosen dynamically. If in the initial subset for an observation vector a reference unit is not represented, then as a representative reference vector a reference vector is added which for the previous observation vector was found to best represent the reference unit: i.e. had the smallest distance to the previous observation vector. To this end, the localizer 50, after having selected an initial subset for an observation vector, checks whether each reference unit is represented in the subset. If not, the representative reference vectors for the unrepresented reference units are added. Next, the full distance of the observation vector to each reference vector in the subset is calculated, followed by selecting for each reference unit a reference vector, which represents the reference unit and has the smallest distance to the observation vector. This reference vector is chosen as the representative reference vector and may be used as such if the subset for the next observation vector requires it. It should be noted that a representative reference vector may stay the same for a large number of consecutive observation vectors. Using the dynamic approach, for each reference unit an initial representative reference vector needs to be selected, to be used to complement the first observation vector, if required. In principle, any reference vector which represents a reference unit may be chosen as the initial representative reference vector. Advantageously, the reference vector which is nearest the weighted average of all reference vectors representing a reference unit is chosen as the initial representative reference vector.

The description focuses on determining the distance of one observation vector to reference vectors, being a key step in pattern recognition and the subject of the invention. It is well understood in the art how this key element can be used in combination with other techniques, such as Hidden Markov Models, to recognise a time-sequential pattern, which is derived from a continual physical quantity. Using such techniques, for each observation vector a vector similarity score, such as a likelihood, between the observation vector and each reference vector of the subset is calculated. For each reference pattern the vector similarity scores of the reference vectors, which represent the reference pattern, are combined to form a pattern similarity score. This is repeated for successive observation vectors. The reference pattern for which an optimum, such as a maximum likelihood, is calculated for the pattern similarity score is located as the recognised pattern. Output means 70 are used for outputting the recognised pattern. This may take various forms, such as displaying the recognised pattern on screen in a textual format, storing the recognised pattern in memory or using the recognised pattern as input, such as a command, for a next processing operation. It is also well understood in the art how techniques, such as a levelled approach, can be used to recognise patterns which comprise a larger sequence of observation vectors than the reference patterns. For instance it is known how to use sub-word units as reference patterns to recognise entire words or sentences. It is also well understood how additional constraints, such as a pronunciation lexicon and grammar, may be placed on the pattern recognition. The additional information, such as the pronunciation lexicon, can be stored using the same memory as used for storing the reference pattern database.

Although the description highlights speech recognition, it will be understood that the invention can be applied to any type of pattern recognition in which the pattern has a time-sequential nature and is derived from a continual physical quantity.

The invention can be summarised in mathematical terms in the following way. A finite number of K reference vectors $\bar{\mu}_1$ to $\bar{\mu}_K$ are given, together forming a set $P=\{\bar{\mu}_1 \ldots \bar{\mu}_K\}$ of reference vectors. The components of the vectors usually represent a continuous value (element of $\mathbb{R}$), making $P \subset \mathbb{R}^D$, where D is the dimension of the reference vector. It should be noted that in practical implementations typically 2-byte integers are used instead of continuous values. The task is to find in an efficient way for each input observation vector $\bar{o} \in \bigcirc$ (wherer $\bigcirc$ is the set of possible observation vectors, $\bigcirc = \mathbb{R}^D$) a reference vector $\bar{\mu}^{opt}$ which is nearest the observation vector $\bar{o}$:

$$\bar{\mu}^{opt} = \mathrm{argmin}\, d(\bar{\mu}, \bar{o})$$
$$\bar{\mu} \in P$$

The computationally complex distance calculation can be reduced by reducing the set $P$ to a a subset of $P$, which with a high likelihood contains $\bar{\mu}^{opt}$ and by searching for $\bar{\mu}^{opt}$ in that smaller subset. The subset is chosen for each observation vector $\bar{o}$. A subset function s can be defined which gives for each observation vector $\bar{o}$ a subset $P_s$ of $P$: s: $\bigcirc \rightarrow \wp(P)$, where $\wp(P)$ is the power set (set of all subsets) of set $\underline{P}$ This gives the reduced task of finding a reference vector $\bar{\mu}^*$:

$$\bar{\mu}^{opt*} = \mathrm{argmin}\, d(\bar{\mu}, \bar{o})$$
$$\bar{\mu} \in P_s$$
$$P_s = s(\bar{o})$$
$$P_s \subset P$$

The subset $P_s$ may not contain $\bar{\mu}^{opt}$. The function s is designed in such a way that the likelihood of $\wp(P)$ containing $\bar{\mu}^{opt}$ is high, making it likely that $\bar{\mu}^* = \bar{\mu}^{opt}$.

In the approach as is known from E. Bocchieri "Vector quantization for the efficient computation of continuous density likelihoods", Proceeding of ICASSP, 1993, pp. 692–695 first the reference vectors are clustered into neighbourhoods. Each neighbourhood is represented by a codeword $\bar{v}_i$, i=1 ... N. The set V of codewords $\bar{v}_i$ is substantially smaller than the set $P$. The codewords $\bar{v}_i$ are derived from $P$. For each codeword $\bar{v}_i$ an associated subset $P_i$ of $P$ is determined in advance. During recognition, an observation vector $\bar{o}$ is quantised to a codeword $\bar{v}_j \in V$ using conventional codeword quantisation. The predetermined subset $P_j$ associated with $\bar{v}_j$ is used as the subset for $\bar{o}$.

clustering: $P \to V = \{\overline{v_i}\}$, and $\overline{v_i} \to P_i \in \wp(P)$ codeword quantising: $\overline{o} \to \overline{v_j}$ giving: $s: O \to V \to \wp(P)$ According to the invention, a quantisation function $\overline{R}$ is used to quantise the reference vectors $\overline{\mu}$ as well as the observation vector $\overline{o}$. Therefore, $\overline{R}$ induces a mapping $P \to P_{\overline{R}}$ and $O \to O_{\overline{R}}$. The distances $d(\overline{R}(\overline{o}), \overline{R}(\overline{\mu}))$ between the quantised observation vector $\overline{R}(\overline{o})$ and each quantised reference vector $\overline{R}(\overline{\mu})$ are calculated. Based on these distances, a subset of quantised reference vectors is selected. This can be described by a subset function $s_{\overline{R}}$ in the $P_{\overline{R}}$ space:

$$s_{\overline{R}}: (O)_R \to \wp(P_{\overline{R}})$$
$$s_{\overline{R}}(\overline{R}(\overline{o})) = \{\overline{R}(\overline{\mu}) \in P_{\overline{R}}: d(\overline{R}(\overline{o}), \overline{R}(\overline{\mu})) < t(\overline{o}, P)\}$$

The threshold function $t(\overline{o}, P)$ provides a threshold. Alternatively, the selection may be based on other mechanisms, such as a predetermined number or a percentage. For each subset of quantised reference vectors, the corresponding subset of reference vectors can be determined, as such the quantisation also induces an inverse map $\overline{R}^*: \wp(P_{\overline{R}}) \to \wp(P)$, such that:

$$\overline{R}^*(M) = \{\overline{\mu} \in P: \overline{R}(\overline{\mu}) \in M\}.$$

In practice, typically a fixed relationship is maintained between each reference vector and its quantised reference vector. This defines s as indicated in the following diagram:

$$\begin{array}{ccc} s: O & \xrightarrow{s} & \wp(P) \\ \downarrow \overline{R} & & \uparrow \overline{R}^* \\ (O)_{\overline{R}} & \xrightarrow{s^*} & \wp(P_{\overline{R}}) \end{array}$$

In a formula s is given by:

$$s(\overline{o}) = \{\overline{\mu} \in P: d(\overline{R}(\overline{o}), \overline{R}(\overline{\mu})) < t(\overline{o}, P)\}$$

Since the quantisation of the reference vectors can be done in advance (e.g. as part of the training) and the quantisation of the observation vector only needs to be performed once, computational savings will in general be achieved if the calculation of the distance between the quantised vectors is simpler than the calculation between the original vectors. One approach for achieving this is to use a quantisation function which reduces the complexity of the components of the vectors, by quantising the vector components to a smaller discrete set B, giving $\overline{R}: \mathbb{R}^D \to B^D$. On some processors, for instance, savings can be made by reducing a vector component from a 2-byte value (representing a continuous value) to 1-byte value. As has been shown, considerable savings can be achieved by reducing the vector components to binary values, for instance $B=\{-1, 1\}$ (which can be represented as $\{0, 1\}$). An example of such a quantisation function is $\overline{R}(\overline{x})=(sign(x_1), \ldots, sign(x_D))^T$. Good results have also been achieved by using as the quantised vector a binary vector multiplied by a scalar, such as the norm of the original vector. This can be seen as a quantisation function $\overline{R}(\overline{x})=(sign(x_1), \ldots, sign(x_D), \|\overline{x}\|)^T$ inducing a mapping $\overline{R}: \mathbb{R}^D \to B^D \times \mathbb{R}^1$, with a special distance measure for the D+1 dimensional vectors. As shown before, the use of part norms can increase the accuracy further. An example of this is using a quantisation function $\overline{R}(\overline{x})=(sign(x_1), \ldots, sign(x_D), \|\overline{x}_1\|, \|\overline{x}_2\|, \ldots, \|\overline{x}_F\|)^T$ inducing a mapping $\overline{R}: \mathbb{R}^D \to B^D \times \mathbb{R}^F$, with a special distance measure for the D+F dimensional vectors.

Another approach for quantising is to reduce the dimension of the vector, keeping vector components of similar complexity, giving $\overline{R}: \mathbb{R}^D \to \mathbb{R}^F$ or $\overline{R}: \mathbb{R}^D \to B^F$, with F<D. Examples of this are using part norms or using a subset of the sign vector components.

Obviously, both approaches can also be combined, giving $\overline{R}: \mathbb{R}^D \to B^E \times \mathbb{R}^F$, with $E \leq D$, $F \leq D$.

What is claimed is:

1. A method for recognising a time-sequential input pattern which is derived from a continual physical quantity, said method comprising the steps of:

accessing said physical quantity and therefrom generating a plurality of input observation vectors, representing said input pattern;

locating among a plurality of reference patterns a recognised reference pattern, which corresponds to said input pattern; at least one reference pattern being a sequence of reference units, each reference unit being represented by at least one associated reference vector $\overline{\mu}_a$ in a set $\{\overline{\mu}_a\}$ of reference vectors, and said locating comprising selecting for each input observation vector $\overline{o}$ a subset $\{\overline{\mu}_s\}$ of reference vectors from said set $\{\overline{\mu}_a\}$ and calculating vector similarity scores between said input observation vector $\overline{o}$ and each reference vector $\overline{\mu}_s$ of said subset $\{\overline{\mu}_s\}$, such that selecting a subset $\{\overline{\mu}_s\}$ of reference vectors for each input observation vector $\overline{o}$ comprises calculating a measure of dissimilarity between said input observation vector $\overline{o}$ and each reference vector of said set $\{\overline{\mu}_a\}$ and using as said subset $\{\overline{\mu}_s\}$ of reference vectors a number of reference vectors $\overline{\mu}_a$, whose measures of dissimilarity with said input observation vector $\overline{o}$ are the smallest;

quantising each reference vector $\overline{\mu}_a$ to a quantised reference vector $\overline{R}(\overline{\mu}_a)$, and wherein selecting the subset $\{\overline{\mu}_s\}$ of reference vectors comprises, for each input observation vector $\overline{o}$, the steps of:

quantising said input observation vector $\overline{o}$ to a quantised observation vector $\overline{R}(\overline{o})$, calculating for said quantised observation vector $\overline{R}(\overline{o})$ distances $d(\overline{R}(\overline{o}), \overline{R}(\overline{\mu}_a))$ to each quantised reference vector $\overline{R}(\overline{\mu}_a)$, and using said distance $d(\overline{R}(\overline{o}), \overline{R}(\overline{\mu}_a))$ as said measure of dissimilarity between said input observation vector $\overline{o}$ and said reference vector $\overline{\mu}_a$; and quantising a vector $\overline{x}$ which is one of a reference vector $\overline{\mu}_a$ or an observation vector $\overline{o}$ to a quantised vector $\overline{R}(\overline{x})$ comprising calculating a sign vector $\overline{S}(\overline{x})$ by assigning to each component of said sign vector a binary value, with a first binary value b1 being assigned if the corresponding component of the vector $\overline{x}$ has a negative value and a second binary value b2 being assigned if the corresponding component of the vector $\overline{x}$ has a positive value.

2. A method as claimed in claim 1, wherein said quantising further comprises calculating an $L_r$-norm of the vector $\overline{x}$ and multiplying said norm with said sign vector $\overline{S}(\overline{x})$.

3. A method as claimed in claim 2, wherein said quantising further comprises dividing said sign vector $S(\bar{x})$ by the dimension of the vector $\bar{x}$ to the power $1/r$.

4. A method as claimed in claim 2, wherein calculating said distances $d(\overline{R(o)}, \overline{R(\mu_a)})$ comprises:
   calculating the $L_r$-norm $\|\bar{\mu}_a\|_r$ of each vector $\bar{\mu}_a$, and
   for each input observation vector $\bar{o}$:
   calculating the $L_r$-norm $\|\bar{o}\|_r$ of the vector $\bar{o}$; and
   calculating a Hamming distance $H(\overline{S(o)}, \overline{S(\mu_a)})$ of the vector $\overline{S(o)}$ to each vector $\overline{S(\mu_a)}$.

5. A method as claimed in claim 1, wherein calculating said distance $d(\overline{R(o)}, \overline{R(\mu_a)})$ comprises calculating a Hamming distance $H(\overline{S(o)}, \overline{S(\mu_a)})$ of the vectors $\overline{S(o)}$ and $\overline{S(\mu_a)}$.

6. A method as claimed in claim 5, wherein calculating said Hamming distance $H(\overline{S(o)}, \overline{S(\mu_a)})$ of the vectors $\overline{S(o)}$ and $\overline{S(\mu_a)}$ comprises:
   calculating a difference vector by assigning to each component of said difference vector the binary XOR value of the corresponding components of $\overline{S(o)}$ and $\overline{S(\mu_a)}$;
   determining a difference number by calculating how many components in said difference vector have the value one; and
   using said difference number as the Hamming distance.

7. A method as claimed in claim 6, wherein:
   said method comprises constructing a table specifying for each N-dimensional vector, with components having a binary value of zero or one, a corresponding number, indicating how many components have the value one; and
   determining said difference number comprises locating said difference vector in said table and using said corresponding number as the Hamming distance.

8. A method as claimed in claim 1, wherein said method is adapted to, after having selected a subset of reference vectors for a predetermined input observation vector $\bar{o}$, use the same subset for a number of subsequent observation vectors.

9. A method as claimed in claim 1, wherein said method comprises:
   after selecting said subset of reference vectors for an input observation vector $\bar{o}$, ensuring that each reference unit is represented by at least one reference vector in said subset, by adding for each reference unit, which is not represented, a representative reference vector to said subset.

10. A method as claimed in claim 9, wherein said method comprises:
    after ensuring that each reference unit is represented by at least one reference vector in said subset, choosing for each reference unit said representative reference vector by selecting as the representative reference vector the reference vector from the subset, which represents said reference unit and has a smallest distance to said input observation vector $\bar{o}$.

11. A system for recognising a time-sequential input pattern, which is derived from a continual physical quantity, said system comprising:
    input means for accessing said physical quantity and therefrom generating a plurality of input observation vectors, representing said input pattern;
    a reference pattern database for storing a plurality of reference patterns; at least one reference pattern being a sequence of reference units, each reference unit being represented by at least one associated reference vector $\bar{\mu}_a$ in a set $\{\bar{\mu}_a\}$ of reference vectors;
    a localizer for locating among the reference patterns stored in said reference pattern database a recognised reference pattern, which corresponds to said input pattern, said locating comprising selecting for each input observation vector $\bar{o}$ a subset $\{\bar{\mu}_s\}$ of reference vectors from said set $\{\bar{\mu}_a\}$ and calculating vector similarity scores between said input observation vector $\bar{o}$ and each reference vector $\bar{\mu}_s$ of said subset $\{\bar{\mu}_s\}$; and
    output means for outputting said recognised pattern;
    wherein said selecting of a subset $\{\bar{\mu}_s\}$ of reference vectors for each input observation vector $\bar{o}$ comprises calculating a measure of dissimilarity between said input observation vector $\bar{o}$ and each reference vector of said set $\{\bar{\mu}_a\}$ and using as said subset $\{\bar{\mu}_s\}$ of reference vectors a number of reference vectors $\bar{\mu}_a$, whose measures of dissimilarity with said input observation vector $\bar{o}$ are the smallest; and
    wherein said reference pattern database further stores for each reference vector $\bar{\mu}_a$ a quantised reference vector $\overline{R(\mu_a)}$, and selecting the subset $\{\bar{\mu}_s\}$ of reference vectors comprises for each input observation vector $\bar{o}$ means for executing the steps of:
    quantising said input observation vector $\bar{o}$ to a quantised observation vector $\overline{R(o)}$,
    calculating for said quantised observation vector $\overline{R(o)}$ distances $d(\overline{R(o)}, \overline{R(\mu_a)})$ to each quantised reference vector $\overline{R(\mu_a)}$, and
    using said distance $d(\overline{R(o)}, \overline{R(\mu_a)})$ as said measure of dissimilarity between said input observation vector $\bar{o}$ and said reference vector $\bar{\mu}_a$; and
    means for quantising a vector $\bar{x}$ which is one of a reference vector $\bar{\mu}_a$ or an observation vector $\bar{o}$ as a quantised vector $\overline{R(x)}$ is proportional to a sign vector $\overline{S}(\bar{x})$, each component of said sign vector $\overline{S(x)}$ comprising a first binary value b1 if the corresponding component of the vector $\bar{x}$ has a negative value and a second binary value b2 if the corresponding component of the vector $\bar{x}$ has a positive value.

12. A system as claimed in claim 11, wherein said quantised vector $\overline{R(x)}$ is proportional to an $L_r$-norm of the vector $\bar{x}$.

13. A system as claimed in claim 12, wherein:
    for each reference vector $\bar{\mu}_a$ the reference pattern database comprises the $L_r$-norm $\|\bar{\mu}_a\|_r$ of the reference vector $\bar{\mu}_a$; and
    said localizer calculates said distances $d(\overline{R(o)}, \overline{R(\mu_a)})$ by, for each input observation vector $\bar{o}$:
    calculating the $L_r$-norm $\|\bar{o}\|_r$ of the vector $\bar{o}$ and a Hamming distance $H(\overline{S(o)}, \overline{S(\mu_a)})$ of the vector $\overline{S(o)}$ to each vector $\overline{S(\mu_a)}$, and
    combining the $L_r$-norm $\|\bar{o}\|_r$ and the Hamming distance $H(\overline{S(o)}, \overline{S(\mu_a)})$ with the $L_r$-norm $\|\bar{\mu}_a\|_r$ stored in said reference pattern database.

14. A system as claimed in claim 11, wherein calculating said distance $d(\overline{R(o)}, \overline{R(\mu_a)})$ comprises calculating a Hamming distance $H(\overline{S(o)}, \overline{S(\mu_a)})$ of the vectors $\overline{S(o)}$ and $\overline{S(\mu_a)}$.

15. A system as claimed in claim 14, wherein calculating said Hamming distance $H(\overline{S(o)}, \overline{S(\mu_a)})$ of the vectors $\overline{S(o)}$ and $\overline{S(\mu_a)}$ comprises:
    calculating a difference vector by assigning to each component of said difference vector the binary XOR value of the corresponding components of $\overline{S(o)}$ and $\overline{S(\mu_a)}$;
    determining a difference number by calculating how many components in said difference vector have the value one, and
    using said difference number as the Hamming distance.

16. A system as claimed in claim 15, wherein:

said system comprises a memory for storing a table specifying for each N-dimensional vector, with components having a binary value of zero or one, a corresponding number, indicating how many components have the value one; and determining said difference number comprises locating said difference vector in said table and using said corresponding number as the Hamming distance.

17. A system as claimed in claim 11, wherein said localizer, after having selected a first corresponding subset of reference vectors for a predetermined input observation vector $\bar{o}$, uses said first subset as said corresponding subset of reference vectors for a number of successive observation vectors.

18. A system as claimed in claim 17, wherein said localizer, after selecting said subset of reference vectors for an input observation vector $\bar{o}$, ensures that each reference unit is represented by at least one reference vector in said subset, by adding for each reference unit, which is not represented, a representative reference vector to said subset.

19. A system as claimed in claim 18, wherein said localizer, after ensuring that each reference unit is represented by at least one reference vector in said subset, chooses for each reference unit said representative reference vector by selecting as the representative reference vector the reference vector from the subset, which represents said reference unit and has a smallest distance to said input observation vector $\bar{o}$.

\* \* \* \* \*